US006289932B1

(12) United States Patent
Thackeray et al.

(10) Patent No.: US 6,289,932 B1
(45) Date of Patent: Sep. 18, 2001

(54) DUAL PORT SOFT START VALVE

(75) Inventors: Christopher G. Thackeray, Etna, CA (US); Preston C. Rosenbaum, Jr., Butte Falls, OR (US); Tim E. Nilsson, Yreka, CA (US)

(73) Assignee: Nor-Cal Products, Inc., Yreka, CA (US)

( * ) Notice: Subject to any disclaimer, the term of this patent is extended or adjusted under 35 U.S.C. 154(b) by 0 days.

(21) Appl. No.: 09/401,042

(22) Filed: Sep. 22, 1999

Related U.S. Application Data

(60) Provisional application No. 60/141,356, filed on Jun. 28, 1999.

(51) Int. Cl.$^7$ .................................................. F16K 1/54
(52) U.S. Cl. ................................ 137/630.15; 137/630
(58) Field of Search ........................... 137/630, 630.15

(56) References Cited

U.S. PATENT DOCUMENTS

| | | | | |
|---|---|---|---|---|
| 1,882,392 | * | 10/1932 | Musgrave | 137/630 |
| 3,078,875 | * | 2/1963 | Farrell et al. | 137/630.15 |
| 3,190,314 | * | 6/1965 | Visos et al. | 137/630.15 |
| 3,211,419 | * | 10/1965 | Klinger-Lohr | 137/630.15 |
| 3,563,274 | * | 2/1971 | Tischler | 137/630.15 |
| 3,631,894 | * | 1/1972 | Frantz | 137/630.15 |
| 3,881,459 | * | 5/1975 | Gaetcke | 137/630.15 |
| 4,041,979 | * | 8/1977 | Grotloh | 137/637.2 |
| 4,342,328 | * | 8/1982 | Matta | 137/630.15 |
| 4,672,203 | * | 6/1987 | Holkerboer | 137/630.15 |
| 5,172,722 | * | 12/1992 | Nishimura | 137/630 |
| 5,492,150 | * | 2/1996 | Aquilino | 137/630.15 |
| 5,618,086 | * | 4/1997 | Reuter | 137/630.15 |
| 5,848,608 | * | 12/1998 | Ishigaki | 137/630 |

OTHER PUBLICATIONS

Chell Instruments, Ltd., Vacuum Isolation and Soft–Start Valves for Critical Applications, advertisement.
HPS Division, MKS Instruments, Inc., High Vacuum Bellows Sealed Valves, catalog, Jul. 1994.
Vat, Angle Valve with Soft–Pump Function, catalog.

* cited by examiner

*Primary Examiner*—John Rivell
(74) *Attorney, Agent, or Firm*—Heisler & Associates

(57) ABSTRACT

A valve 10 is provided which has two pathways which each extend between an inlet bore 4 and an outlet bore 6 of the valve 10. A soft start passage 55 initially opens to equalize pressure between the inlet bore 4 and the outlet bore 6. A main poppet or other barrier 50 then opens to provide direct communication of large volumes of gas between the inlet bore 4 and the outlet bore 6. A pneumatic cylinder 20 has a single piston 30 therein which is moved downward to actuate a soft start shaft 40 and associated soft start poppet 45 to open the soft start passage 55. When air is directed into a lower air chamber 28 below the piston 30, the piston 30 is caused to be elevated within the pneumatic cylinder 20 and the entire soft start shaft 40 and main poppet 50 assembly moves up to provide direct access of larger volumes of gas between the inlet bore 4 and the outlet bore 6. A soft start return spring 42 and main spring 58 bias the piston 30 toward a central position within the pneumatic cylinder 20 with the soft start poppet 45 and main poppet 50 both in closed positions.

23 Claims, 4 Drawing Sheets

DUAL PORT SOFT START VALVE

This application claims benefit under Title 35, U.S. Code §119(e) of U.S. Provisional Application No. 60/141,356 filed on Jun. 28, 1999.

FIELD OF THE INVENTION

The following invention relates to valves which have multiple ports for communication of fluids between a common inlet and a common outlet. More particularly, this invention relates to valves used particularly in ultra high vacuum conditions which include a smaller "soft start" port and a larger "main" port so that pressure can be equalized on opposite sides of the valve initially through the soft start port before the main port is opened between the inlet and the outlet.

BACKGROUND OF THE INVENTION

Ultra high vacuum handling equipment such as that used in semiconductor processing and other ultra high vacuum environments typically have valves appropriately located therein to control flow of gases through the equipment. Such ultra high vacuum equipment valves can have a variety of different configurations but are often configured as poppet valves which can be actuated in a variety of different ways to provide access between an inlet and an outlet of the valve.

Often a pressure of the gases on either side of the valve are somewhat different before the valve is opened. When the valve is initially opened a rush of gas through the valve occurs to equalize pressure on either side of the valve. This rush of air to equalize pressure through the valve can be undesirable in many circumstances. For instance, in semiconductor device manufacturing equipment, it is important that contaminants be eliminated from regions where manufacturing processes are occurring. When a rush of air occurs through a valve that is opening, particles which had previously settled to inside surfaces of the vacuum handling equipment can be stirred up into a free floating state and then land on devices being processed, causing damage.

One known technique for eliminating an initial rush of air through an opening valve and the related negative consequences is to utilize a valve having a "soft start" feature. Soft start valves include two ports/pathways passing between a single common inlet of the valve and a single common outlet of the valve. The first soft start port is significantly smaller in size than a second "main" port. When the valve is to be opened, the soft start port is opened first so that pressure can be equalized through a small soft start passage. This smaller passage is sufficiently small that pressure is balanced between the inlet and the outlet of the valve without stirring up particulates which may be resting on either side of the valve. After pressure has been equalized through the soft start passage, the main port is opened to provide full communication between the inlet and the outlet of the valve.

Known prior art valves which include such a soft start feature include the "Series 62" angle valve with soft start function provided by VAT, Inc. of Woburn, Mass.; the "VacuComp" series 150/160 valve by MKS Instruments, Inc. of Boulder Colo.; and the "XLD" vacuum soft start valves by SMC Pneumatics, Inc. of Indianapolis, Ind. While these known prior art "soft start" valves are generally effective, they suffer from being unnecessarily complex and including substantially separate activation systems for the two ports, resulting in valves which are difficult to manufacture and which are not as easily maintained in proper working order. Such drawbacks are particularly magnified in semiconductor processing equipment where automated processes require repetitive opening and closing of the valves over long periods of time.

Accordingly, a need exists for a "soft start" valve which has a simpler design and which has fewer moving parts so that a valve capable of longer life, greater reliability and simpler manufacture is provided.

SUMMARY OF THE INVENTION

This invention provides a "soft start" valve which has both a "soft start" port/pathway and a main port/pathway opened by movement of a single piston within a single pneumatic cylinder. The soft start port is preferably located within a main poppet with a soft start shaft coaxially passing through a shaft bore within a main shaft. The soft start shaft is coupled directly to the piston so that when the piston moves down, the soft start shaft moves down relative to the main shaft and the soft start poppet moves down below the main poppet to open the soft start port. A soft start return spring and a main spring bias the piston at a middle position within the pneumatic cylinder. When the piston is moved upward within the pneumatic cylinder, the soft start shaft and soft start poppet move up with the piston and lift the main poppet and main shaft upward along with the piston.

Separate air (or other actuation fluid) ports lead to regions within the pneumatic cylinder above and below the piston so that the piston can be driven in the direction desired for either soft start function of the valve or main function of the valve. A single bellows preferably extends up from the main poppet. The main spring biases the main poppet in a closed position down against the body of the valve surrounding the outlet bore of the body. The single dual acting piston simplifies the method by which the valve is caused to act in either the soft start mode or the main mode, simplifying the overall valve actuation mechanism of this invention.

OBJECTS OF THE INVENTION

Accordingly, a primary object of the invention to provide a valve which has both a soft start port and a main port each passing between a common inlet and a common outlet of the valve, with the soft start port sufficiently small to prevent significant turbulence from being generated when the soft start port of the valve is opened and a pressure differential exists across the valve.

Another object of the present invention is to provide a valve with a soft start port which is capable of reliable operation over numerous cycles.

Another object of the present invention is to provide a soft start valve which is pneumatically actuated and has a separate air port for actuating the soft start portion of the valve and a separate air port for actuating the main portion of the valve.

Another object of the present invention is to provide a soft start valve which can be readily manufactured.

Another object of the present invention is to provide a soft start valve which is suitable for use in ultra high vacuum applications.

In addition to the above objects, various other objects of this invention will be apparent from a careful reading of this specification including the detailed description contained herein below.

BRIEF DESCRIPTION OF THE DRAWING FIGURES

DETAILED DESCRIPTION OF THE PREFERRED EMBODIMENT

Figure 1:
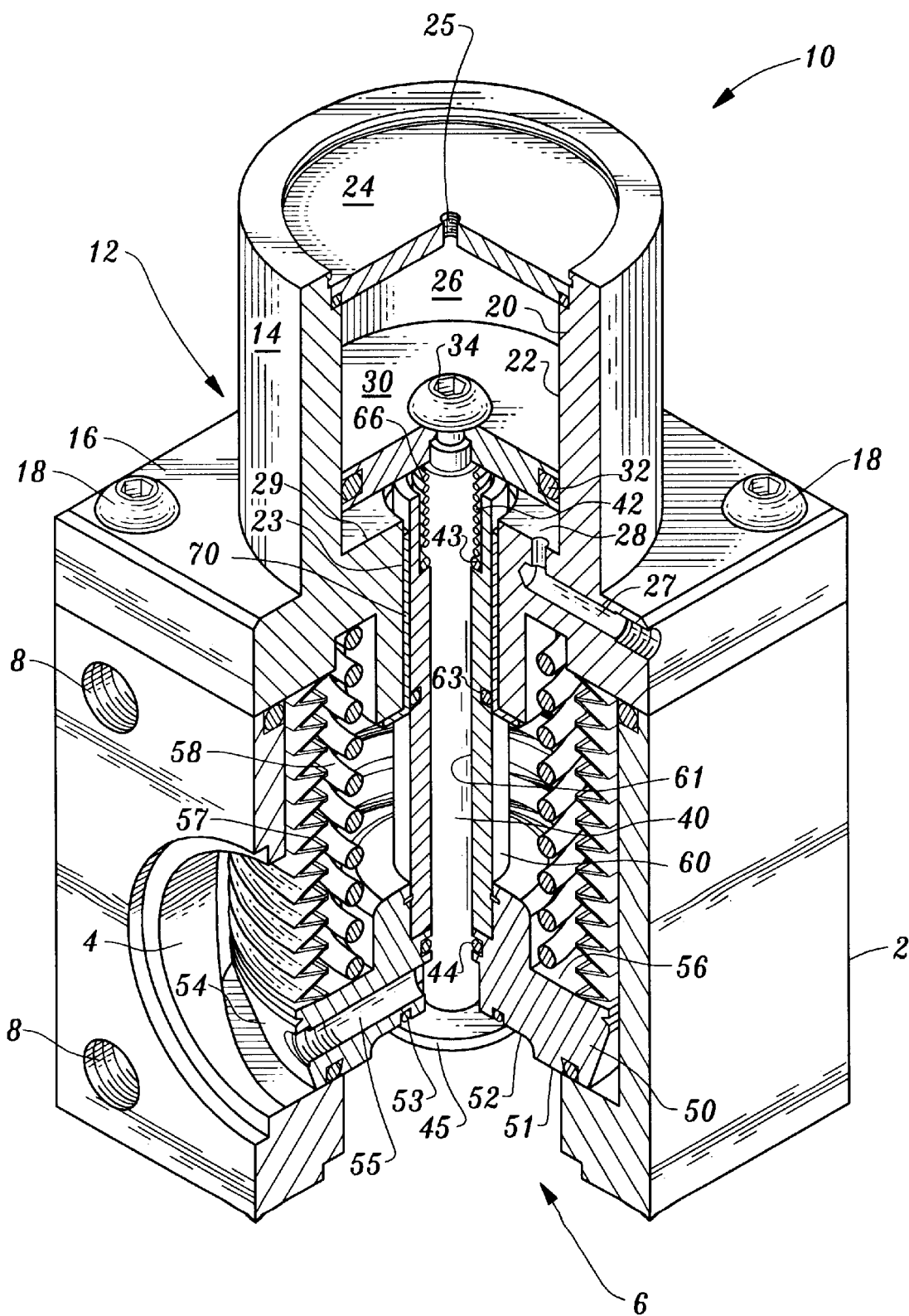
FIG. 1 is a perspective three-quarter section view of the valve of this invention with both the soft start port and main port of the valve in their closed positions.

Referring to the drawings, wherein like reference numerals represent like parts throughout the various drawing figures, reference numeral 10 is directed to a dual port "soft start" valve for selectively allowing passage of gases between an inlet bore 4 and an outlet bore 6 (FIG. 1). Because the valve 10 includes both a soft start port and a main port/pathway, with the soft start port smaller than the main port, the valve 10 can initially have the soft start port open to equalize pressure across the valve 10 and then have the main port open after any pressure differential has been eliminated. Hence, the main port opens without disruption of any particulates which might be at rest upstream or downstream from the valve 10.

In essence, and with particular reference to FIG. 1, the basic structure of the valve 10 is described. The valve 10 includes a body 2 which supports an inlet bore 4 and an outlet bore 6. A bonnet 12 attaches to the body 2 and supports a pneumatic cylinder 20 for actuation of the valve 10 to selectively allow communication between the inlet bore 4 and the outlet bore 6. The pneumatic cylinder 20 has a piston 30 which can move vertically both up and down away from a central at rest position within the pneumatic cylinder 20. A soft start shaft 40 is securely attached to the piston 30 so that the soft start shaft 40 always moves with the piston 30. A soft start poppet 45 is located on an end of the soft start shaft 40 opposite the piston 30.

When the piston 30 moves down within the pneumatic cylinder 20, the soft start poppet 45 moves down away from a main poppet 50 adjacent the soft start poppet 45 which occludes the outlet bore 6 of the valve 10. The soft start port is thus opened. When the piston 30 is moved upward within the pneumatic cylinder 20, the soft start shaft 40 moves upward with the piston 30, and with the soft start poppet 45 remaining closed against the main poppet 50, the piston 30 lifts the main poppet 50 up away from the outlet bore 6 of the valve 10, so that the inlet bore 4 and outlet bore 6 are placed in direct communication with each other.

A soft start return spring 42 keeps the soft start poppet 45 closed against the main poppet 50 except when the piston 30 is moved down within the pneumatic cylinder 20. A main spring 58 keeps the main poppet 50 adjacent the outlet bore 6 of the valve 10 except when the piston 30 is moved upward within the pneumatic cylinder 20 and the main spring 58 is compressed. When pressure within the pneumatic cylinder is released on both sides of the piston 30, the soft start return spring 42 and main spring 58 maintain the piston 30 at a central position within the pneumatic cylinder and the soft start poppet 45 is positioned closed against the main poppet 50 with the main poppet 50 closed against the outlet bore 6 of the valve 10, so that both the soft start port and the main port of the valve 10 are closed.

Figure 4:
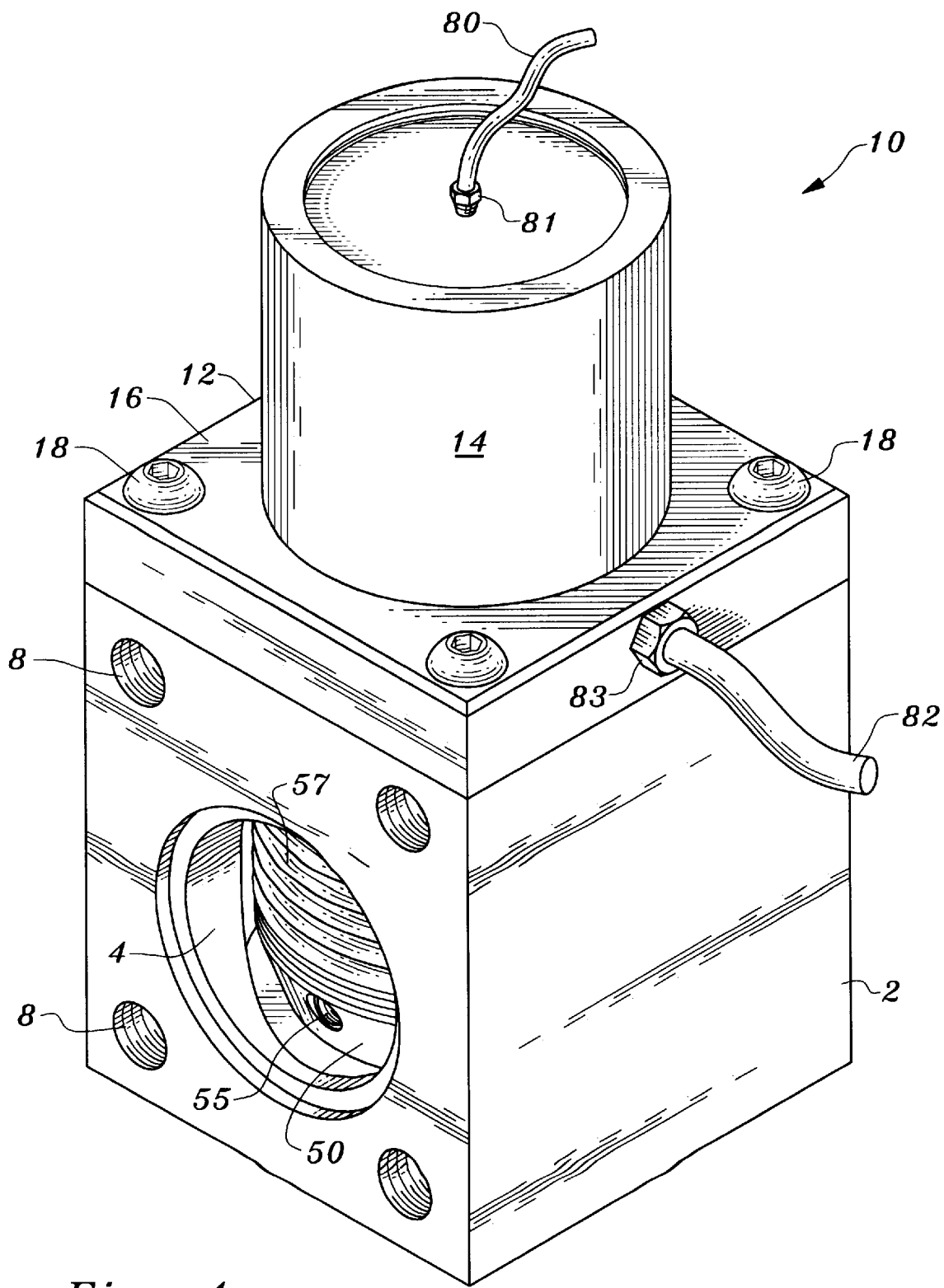
FIG. 4 is a perspective view of that which is shown in FIG. 1 revealing an exterior appearance of the valve and air porting for actuation of the valve of this invention.

More specifically, and with particular reference to FIG. 4, the particular details of the body 2 and bonnet 12 of the invention are described. The body 2 of the valve 10 is preferably a solid unitary mass of material which includes a central cavity with the inlet bore 4 passing thereinto and the outlet bore 6 passing thereinto. Attachment holes 8, or other attachment means are provided in the body 2 to allow adjacent portions of a vacuum handling system or other system in which the valve 10 is located, to attach to the body 2 of the valve 10. The inlet bore 4 is preferably formed in one of the side surfaces of the body 2 and the outlet bore 6 is preferably located on the bottom surface of the body 2. The body 2 preferably includes six surfaces so that the body 2 has a generally cubic form. An upper surface of the body 2 is preferably open so that portions of the valve 10 suspended from the bonnet 12 can extend down into the interior cavity within the body 2.

The bonnet 12 is configured to attach to the body 2 over the top of the body 2, closing off the cavity within the body 2 so that the only access through the body 2 is through the inlet bore 4 and outlet bore 6. The bonnet 12 includes a cylindrical housing 14 on an uppermost portion thereof which surrounds the pneumatic cylinder 20 described in detail below. A shelf 16 extends from a lower end of the cylindrical housing 14 and has a generally square shape matching that of the top side of the body 2. A series of mounting bolts 18 or other connection means can be utilized to securely connect the bonnet 12 onto the body 2.

With particular reference to FIG. 1, the particular details of the pneumatic cylinder 20 are described. The pneumatic cylinder 20 acts as an actuator for the soft start port and main port within the valve 10 of this invention. The pneumatic cylinder 20 is a hollow chamber with a cylindrical side wall 22 which extends vertically up into the cylindrical housing 14 of the bonnet 12 and is sufficiently strong to support elevated pressures within the cylinder 20. A central bore 23 extends vertically down from the pneumatic pressure cylinder 20 and into the interior cavity within the body 2 of the valve 10. This central bore 23 is filled with structures including the soft start shaft 40 and main shaft 60 as discussed below.

A cap 24 seals off an upper end of the pneumatic cylinder 20. A soft start air (or other actuation fluid) port 25 is located within the cap 24 so that soft start port actuating fluid (preferably air) can be directed into the pneumatic cylinder 20 when opening of the soft start port of the valve 10 is desired. Typically, the soft start air port 25 would be coupled to a soft start air inlet hose 80 and fitting 81 (FIG. 4) to supply air or other gas for pushing the piston 30 down within the pneumatic cylinder 20 and opening the soft start port of the valve 10. The soft start air port 25 is hence an actuation port for the valve 10. An upper air chamber 26 defines a portion of the pneumatic cylinder 20 located above the piston 30.

A main air (or other actuation fluid) port 27 extends through the shelf 16 and the cylindrical housing 14 of the bonnet 12 and into the pneumatic cylinder 20 below the piston 30. A lower air chamber 28 defines a portion of the pneumatic cylinder 20 below the piston 30 which can be fed by air through the main air port 27. A main air inlet hose 82 (FIG. 4) and fitting 83 are preferably attached to the main air port 27 to direct air into the main air port 27 and lift the piston 30 within the pneumatic cylinder 20 (FIG. 3) for opening of the main port of the valve 10. The main air port 27 is hence a second actuation port for the valve 10. A lower surface 29 defines a lowermost portion of the pneumatic cylinder 20 which is generally coextensive with the shelf 16 of the bonnet 12. Preferably, the main air port 27 passes up through the lower surface 29 so that the main air port 27 always remains in communication with the lower air chamber 28 below the piston 30.

The piston 30 is oriented horizontally within the pneumatic cylinder 20 with a circular cross-section matching cross-sectional dimensions of the cylindrical side wall 22 (FIG. 1) of the pneumatic cylinder 20. A ring seal 32 is positioned around a periphery of the piston 30 which abuts the cylindrical side wall 22 of the pneumatic cylinder 20. Hence, the piston 30 moves in an airtight manner up and down within the pneumatic cylinder 20. The piston 30 is a rigid construct which is configured with an appropriate groove to hold the ring seal 32 in position against the cylindrical side walls 22 of the pneumatic cylinder 20 when the piston 30 is moving. A mounting bolt 34 passes through the piston 30 and securely attaches the piston 30 to the soft start shaft 40 extending down from the piston 30 and through the central bore 23 out of the pneumatic cylinder 20.

With particular reference to FIG. 1, details of the soft start port and main port are described. The soft start shaft 40 is a rigid elongate structure extending linearly along a central axis of the valve 10 through the central bore 23 and extending all the way down to a position adjacent the outlet bore 6 of the body 2 of the valve 10. The soft start shaft 40 includes a soft start return spring 42 which keeps the piston 30 and hence the attached soft start shaft 40 in the neutral middle position within the pneumatic cylinder 20, except when sufficient air pressure accumulates within the upper chamber 26 of the pneumatic cylinder 20 to overcome spring forces exerted by the soft start return spring 42. The piston 30 is thus biased to this first middle position.

When sufficient air pressure collects within the upper air chamber 26, the soft start return spring 42 is compressed and the soft start shaft 40 is moved down along the shaft 40 long axis with the piston 30. An upper seal 43 and a lower seal 44 surround the soft start shaft 40 and assist in maintaining a tight seal around the soft start shaft 40 as the soft start shaft 40 moves down.

A soft start poppet 45 is located at an end of the soft start shaft 40 opposite the piston 30. The soft start poppet 45 flares out and abuts a central recess seat 52 formed in a bottom surface 51 of the main poppet 50. Because the main poppet 50 securely abuts the outlet bore 6, when the piston 30 is moved downward by accumulation of air pressure in the upper air chamber 26, the soft start return spring 42 is compressed and the soft start shaft 40 moves down within a shaft bore 61 within a main shaft 60 attached to the main shaft poppet 50 until the soft start shaft 40 causes the soft start poppet 45 to extend below the bottom surface 51 of the main poppet 50. The soft start shaft 40 is thus an actuation shaft for the valve 10.

When the soft start poppet 45 moves away from the main poppet 50, a soft start passage 55 opens up to provide a secondary pathway for gas to pass between the inlet bore 4 and the outlet bore 6. Specifically, the soft start passage 55 is a small diameter bore which extends horizontally between a side surface 54 of the main poppet 50 and the bottom surface 51 of the main poppet 50. When the soft start poppet 45 abuts against the bottom surface 51 of the main poppet 50 within the central recess seat 52, the soft start passage 55 remains closed. The soft start poppet 45 thus provides one form of a secondary barrier for the secondary pathway. A seat seal 53 abuts the soft start poppet 45 and the central recess seat 52 where the seat seal 53 is attached. Hence, a gas tight seal is provided when the soft start poppet 45 is positioned adjacent the bottom surface 51 of the main poppet 50.

A main spring 58 keeps the main poppet 50 closed against the outlet bore 6 by providing a downward force against the top surface 56 of the main poppet 50. The main poppet 50 provides one form of a main barrier blocking the main pathway/passage when the main poppet 50 is in its closed position. The main spring 58 is preferably configured as a helical compression spring with an upper surface of the main spring 58 abutting against portions of the bonnet 12. When air is directed into the lower air chamber 28 within the pneumatic cylinder 20 with sufficient pressure to cause the piston 30 to move upward and compress the main spring 58, the main poppet 50 moves off of the outlet bore 6 into an open position, allowing passage of gas between the inlet bore 4 and the outlet bore 6.

A bellows 57 preferably extends between the top surface 56 and an underside of the bonnet 12 within the cavity of the body 2. The bellows 57 is airtight and assists in preventing leakage between the inlet bore 4 and outlet bore 6 of the valve 10 and the various actuator components within the valve 10.

The main shaft 60 extends up from the top surface 56 of the main poppet 50. The main shaft 60 has the hollow shaft bore 61 sized to receive the soft start shaft 40 passing therethrough. A shaft seal 63 is located within a notch in the main shaft 60 and assists in aligning and maintaining gas tight function of the main shaft 60. The main shaft 60 supports a lower end of the soft start return spring 42 upon a spring shelf 66 near an upper end of the main shaft 60. In this way, the soft start return spring 42 tends to lift the piston 30 and close the soft start poppet 45 against the central recess seat 52 of the main poppet 50. The upper seal of the soft start shaft 40 preferably is also located upon the spring shelf 66 directly below the soft start return spring 42. As with the main spring 58, the soft start return spring 42 is preferably configured as a helical compression spring.

A liner 70 is preferably located within the central bore 23 which provides a bearing surface for the main shaft 60 to ride upon. The liner 70 can be formed of an appropriate material to maintain the desired seal integrity and low friction characteristics for a large number of repetitive cycles of valve 10 operation without requiring maintenance or replacement of the valve 10.

Figure 2:
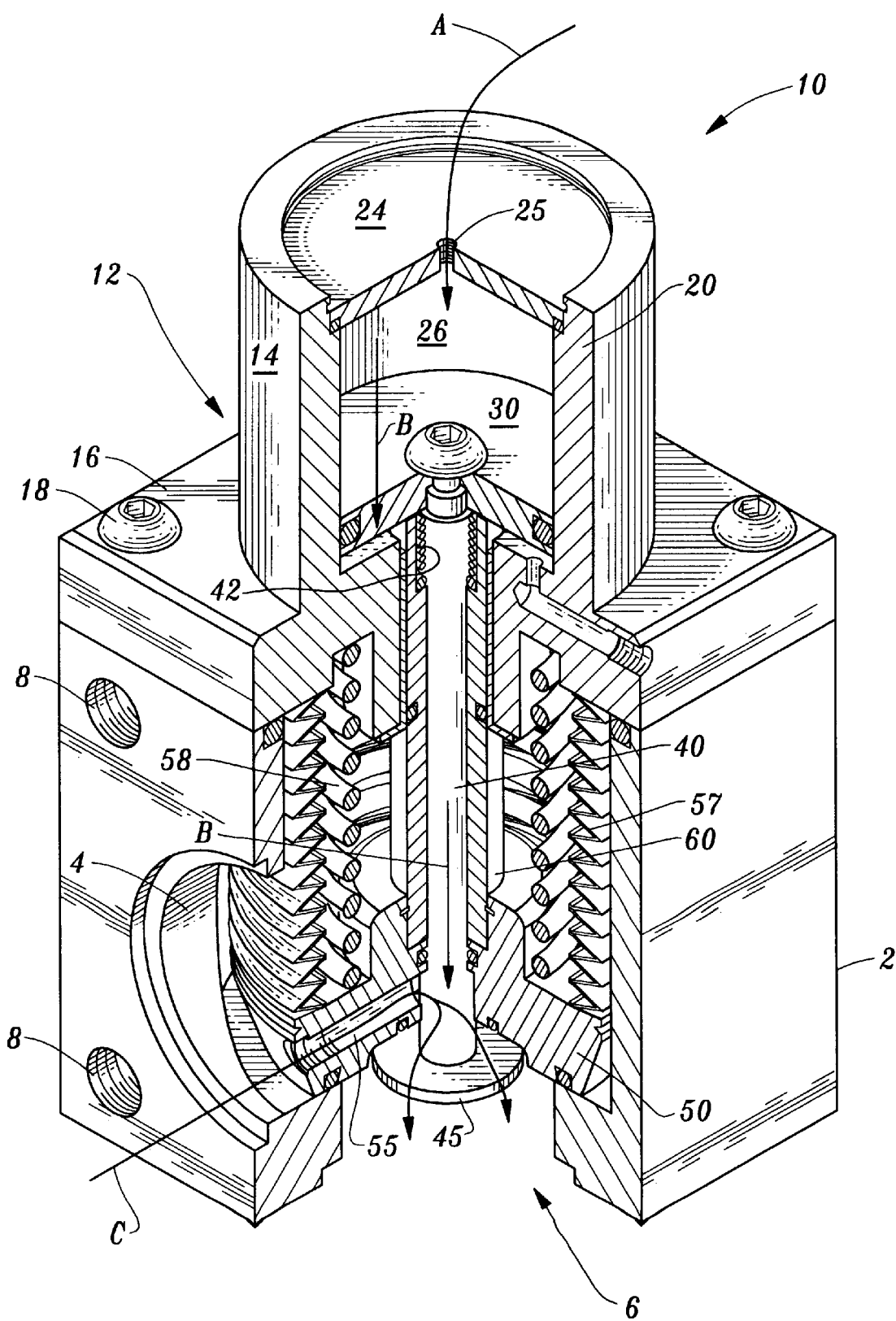
FIG. 2 is a perspective three-quarter section view of that which is shown in FIG. 1 with the soft start port open and with the main port closed.
Figure 3:
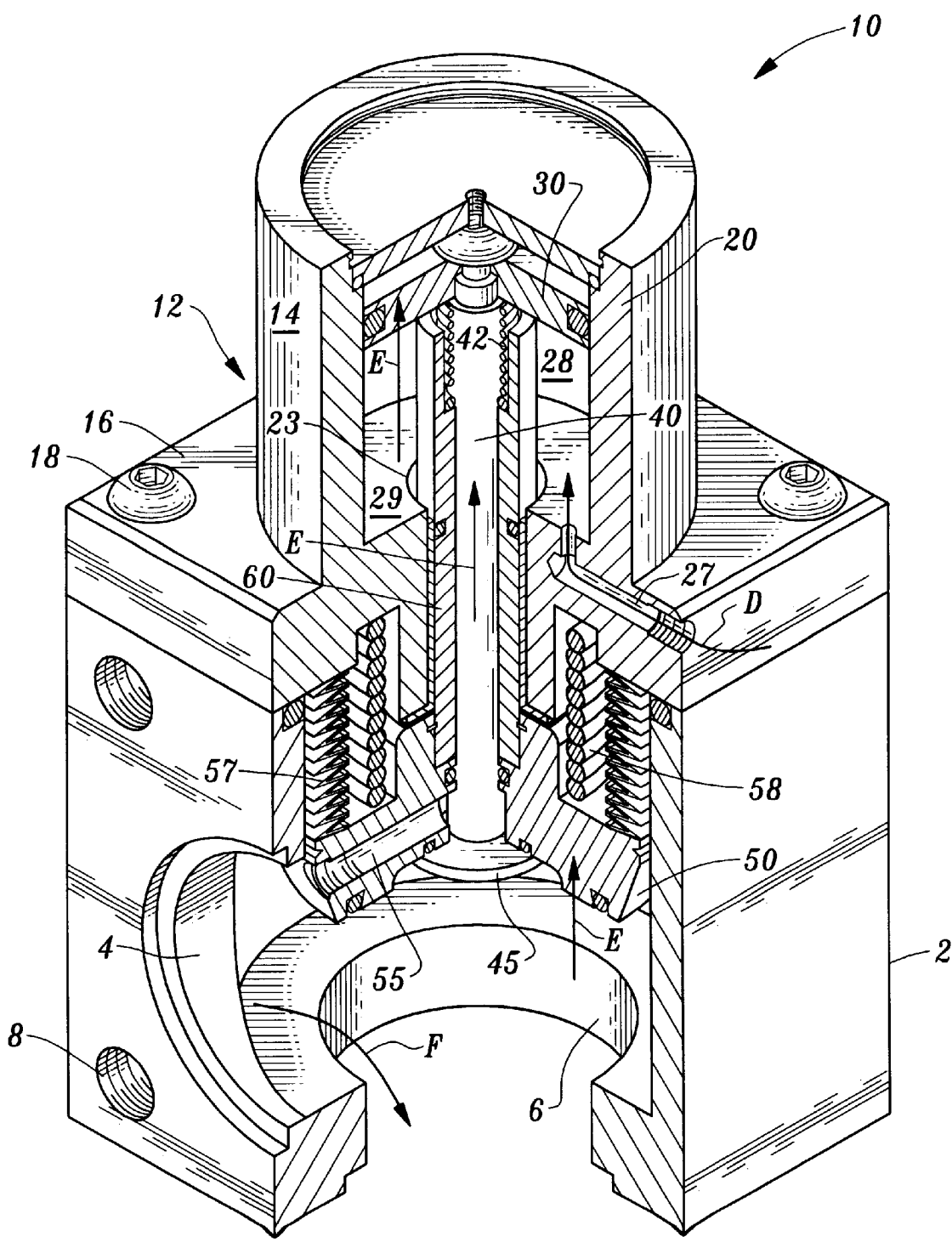
FIG. 3 is a perspective three-quarter section view of that which is shown in FIG. 1 with the soft start port closed and with the main port open.

With particular reference to FIGS. 1–3, details of the operation of the valve 10 are described. Initially, and as shown in FIG. 1, the pneumatic cylinder 20 is not provided with any differential in air pressure across the piston 30 and the soft start return spring 42 and main spring 58 cause the piston 30 to be positioned in a first neutral central position. In this neutral position, the soft start poppet 45 securely abuts the central recess seat 52 and the bottom surface 51 of the main poppet 50 so that the soft start passage 55 is closed. Also in this neutral position, the main poppet 50 is securely pressed down against the body 2 of the valve 10 surrounding the outlet bore 6. Hence, the valve 10 is entirely closed and no passage of gas between the inlet bore 4 and the outlet bore 6 is allowed.

When it is desired to open the valve 10 in a manner which will decrease any turbulent rush of air when pressure differentials across the valve 10 initially equalize, the soft start port of the valve 10 can be opened first before opening of the main port of the valve 10. To open the soft start port, air is initially directed through the soft start air inlet hose 80 (FIG. 4), through the soft start air port 25 (FIG. 1) and into the upper air chamber 26 of the pneumatic cylinder 20 (arrow A of FIG. 2). The air or other gas can be provided from a compressed fluid source with an appropriate electronic controller utilized to open and close the appropriate valves to direct or preclude actuation fluid from passing into the pneumatic cylinder 20 above the piston 30. When sufficient air (or other actuation fluid) pressure collects within the upper air chamber 26 above the piston 30, the piston 30 moves down within the pneumatic cylinder 20 (arrow B of FIG. 2) to a second position and the soft start return spring 42 is compressed.

Because the soft start shaft 40 and soft start poppet 45 are rigidly attached to the piston 30, the soft start shaft 40 causes the soft start poppet 45 to be pushed down below the central recess seat 52 adjacent the bottom surface 51 of the main poppet 50. When the piston 30 moves, the soft start passage 55 is thus opened so that gases can pass between the inlet bore 4 and the outlet bore 60 through the soft start passage 55 (arrow C of FIG. 2). The soft start passage 55 is sized sufficiently small so that even when large pressure differentials exist between the inlet bore 4 and the outlet bore 6, no significant turbulent rush of air occurs between the inlet bore 4 and the outlet bore 6.

Once pressure is equalized between the inlet bore 4 and outlet bore 6, the valve 10 is ready to have the main port opened. Initially, pressure is preferably released within the soft start air inlet hose 80 (FIG. 4) so that the piston 30 can return to its first neutral central position and the soft start poppet 45 can be caused to return to a closed position adjacent the bottom surface 51 of the main poppet 50 by action of the soft start return spring 42. Pressure can then be directed to the main air inlet hose 82 (FIG. 4) and into the lower air chamber 28 (arrow D of FIG. 3), causing the piston 30 to move upward to a third position within the pneumatic cylinder 20 (along arrow E of FIG. 3). Sufficient air pressure must accumulate within the lower chamber 28 to overcome forces exerted by the main spring 58, pushing down upon the main poppet 50 and holding the main poppet 50 adjacent the body 2 where it surrounds the outlet bore 6. The piston 30 then moves upward within the pneumatic cylinder 20 and carries the soft start shaft 40 along with it.

Because the soft start shaft 40 already has the soft start poppet 45 directly adjacent the bottom surface 51 of the main poppet 50, the soft start shaft 40 effectively lifts the main poppet 50 and attached main shaft 60 up within the central bore 23 (arrow E), causing the main port to be opened with the main poppet 50 elevated above the outlet bore 6 and allowing gases to freely communicate between the inlet bore 4 and the outlet bore 6 (arrow F of FIG. 3). Hence, the soft start shaft 40 influences the position of both the soft start poppet 45 and the main poppet 50. When the valve 10 is to again be closed, air pressure is allowed to subside within the pneumatic cylinder 20 and the piston 30 allowed to return to its neutral position by action of the main spring 58, with the main poppet 50 closed against the body 2 adjacent the outlet bore 6 of the valve 10. The sequence can then be repeated. Because the separate air inlet hoses 80, 82 supply the upper air chamber 26 and the lower air chamber 28, a user of the valve 10 can carefully control and program the sequential opening of the soft start port and then the main port for effective repetitious operation with an amount of lag time between opening of the soft start port and the main port being programmed by the user.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A pressure actuated two stage valve, comprising in combination:

an inlet for fluids passing into said valve;

an outlet for fluids passing out of said valve;

a main pathway extending between said inlet and said outlet;

a main barrier movable between a closed position and an open position, said closed position of said main barrier blocking said main pathway;

a secondary pathway extending between said inlet and said outlet, at least a portion of said secondary pathway distinct from said main pathway;

a secondary barrier movable between a closed and an open position, said closed position of said secondary barrier blocking said secondary pathway;

a pressure cylinder having at least one piston therein, said one piston configured to move within said cylinder, said one piston influencing the position of both said main barrier and said secondary barrier; and said one piston influencing the position of said secondary barrier without necessarily influencing the position of said main barrier.

2. The valve of claim 1 wherein said one piston has at least three distinct positions within said pressure cylinder including:

a first position corresponding to said main barrier being in said closed position and said secondary barrier being in said closed position, a second position corresponding to said main barrier being in said closed position and said secondary barrier being in said open position, and a third position with said main barrier in said open position; and said one piston holding each of said positions for as much time as desired by a controller of said one piston position.

3. The valve of claim 1 wherein said piston is connected to a shaft, said shaft fixed to said secondary barrier, such that when said piston moves said shaft and said secondary barrier move along with said piston.

4. The valve of claim 3 wherein said secondary pathway passes through said main barrier, said main barrier and said secondary barrier configured as poppets, said secondary barrier abutting said main barrier when said second barrier is in said closed position, said secondary barrier spaced from said main barrier when said secondary barrier is in said open position.

5. A pressure actuated two stage valve, comprising in combination:

an inlet for fluids passing into said valve;

an outlet for fluids passing out of said valve;

a main pathway extending between said inlet and said outlet;

a main barrier movable between a closed position and an open position, said closed position of said main barrier blocking said main pathway;

a secondary pathway extending between said inlet and said outlet, at least a portion of said secondary pathway distinct from said main pathway;

a secondary barrier movable between a closed and an open position, said closed position of said secondary barrier blocking said secondary pathway;

a pressure cylinder having at least one piston therein, said one piston configured to move within said cylinder, said piston influencing the position of both said main barrier and said secondary barrier;

wherein said one piston has at least three distinct positions within said pressure cylinder including a first position corresponding to said main barrier being in said closed position and said secondary barrier being in said closed position, a second position corresponding to said main barrier being in said closed position and said secondary barrier being in said open position, and a third position with said main barrier in said open position; and wherein said first position of said one piston is located between said second position and said third position within said pressure cylinder.

6. The valve of claim 5 wherein said one piston is biased to remain in said first position unless forces act upon said one piston.

7. The valve of claim 5 wherein said pressure cylinder includes at least two actuation ports for receiving an actuation fluid into said pressure cylinder, one of said at least two actuation ports located on a first side of said one piston when said piston is in said first orientation and another of said actuation ports located on a second side of said one piston opposite said first side of said piston when said piston is in said first position within said cylinder.

8. A soft start valve for controlling gas flow within vacuum handling equipment, the valve comprising in combination:

an inlet for gases passing into said valve;

an outlet for gases passing out of said valve;

a main pathway extending between said inlet and said outlet;

a main barrier movable between a closed position and an open position, said closed position of said main barrier blocking said main pathway;

a soft start pathway extending between said inlet and said outlet, at least a portion of said soft start pathway distinct from said main pathway;

a soft start barrier movable between a closed position and an open position, said closed position of said soft start barrier blocking said soft start pathway;

at least one actuation shaft influencing the position of both said main barrier and said soft start barrier;

wherein said actuation shaft is capable of movement in two directions including a first direction corresponding to said soft start barrier moving from said closed position to said open position, said second direction corresponding with said main barrier moving from said closed position to said open position; and wherein said first direction of actuation shaft movement is opposite said second direction of said actuation shaft movement.

9. The valve of claim 8 wherein said actuation shaft is fixed to said soft start barrier.

10. The valve of claim 9 wherein said soft start barrier abuts said main barrier when said soft start barrier is in said closed position, said soft start pathway passing through said main barrier.

11. The valve of claim 10 wherein said main barrier and said soft start barrier are each configured as poppets.

12. A soft start valve for controlling gas flow within vacuum handling equipment, the valve comprising in combination:

an inlet for gases passing into said valve;

an outlet for gases passing out of said valve;

a main pathway extending between said inlet and said outlet;

a main barrier movable between a closed position and an open position, said closed position of said main barrier blocking said main pathway;

a soft start pathway extending between said inlet and said outlet, at least a portion of said soft start pathway distinct from said main pathway;

a soft start barrier movable between a closed position and an open position, said closed position of said soft start barrier blocking said soft start pathway;

at least one actuation shaft influencing the position of both said main barrier and said soft start barrier;

wherein said actuation shaft is capable of movement in two directions including a first direction corresponding to said soft start barrier moving from said closed position to said open position, said second direction corresponding with said main barrier moving from said closed position to said open position;

wherein said actuation shaft is fixed to said soft start barrier;

wherein said soft start barrier abuts said main barrier when said soft start barrier is in said closed position, said soft start pathway passing through said main barrier;

wherein said main barrier and said soft start barrier are each configured as poppets; and wherein said actuation shaft includes a piston thereon, said piston residing within a cylinder with actuation ports located on either side of said piston within said cylinder, such that when actuation fluid is entered on one side of said piston to increase a pressure on one side of said piston, said piston is caused to move within said cylinder, in turn causing said actuation shaft to move.

13. A two passage valve, comprising in combination:

an inlet for fluids flowing into said valve;

an outlet for fluids flowing out of said valve;

a main passage extending between said inlet and said outlet;

a main barrier movable between a closed position and an open position, said closed position of said main barrier blocking said main passage;

a secondary passage extending between said inlet and said outlet, at least a portion of said secondary passage distinct from said main passage;

a secondary barrier movable between a closed position and an open position, said closed position of said secondary barrier blocking said secondary passage;

at least one actuation shaft influencing the position of both said main barrier and said secondary barrier;

wherein said actuation shaft is capable of movement between at least three positions including a first position in which said main barrier is in said closed position and said secondary barrier is in said closed position, a second position in which said main barrier is in said closed position and said secondary barrier is in said open position, and a third position in which said main barrier is in said open position;

wherein said actuation shaft has an elongate form and extends linearly between ends of said shaft, said shaft moving linearly along a long axis of said shaft when said shaft is repositioned between said first position, said second position and said third position; and wherein said first position for said actuation shaft is located between said second position for said shaft and said third position for said shaft.

14. The valve of claim 13 wherein said actuation shaft is biased to remain in said first position unless forces act on said shaft.

15. The valve of claim 13 wherein a piston is attached to said actuation shaft, said piston located within a single cylinder having a cross-sectional contour similar to a cross-sectional contour of said piston, such that said piston moves within said cylinder when said shaft moves between said first position, said second position and said third position, said cylinder including two actuation ports with one of said two ports on either side of said piston, said ports coupled to a source of actuation fluid at elevated pressure, such that elevated pressure fluid can enter into said cylinder on one side of said piston and cause said piston to move within said cylinder, and in turn causing said shaft to move between said first position, said second position and said third position.

16. The valve of claim 15 wherein said shaft is fixed to said secondary barrier, said secondary barrier abutting said main barrier without attachment to said main barrier when said secondary barrier is located in said closed position.

17. A pressure actuated valve, comprising in combination:
an inlet for fluids passing into said valve;
an outlet for fluids passing out of said valve;
a main pathway extending between said inlet and said outlet;
a main barrier movable between a closed position and an open position, said closed position of said main barrier blocking said main pathway;
a secondary pathway extending between said inlet and said outlet, at least a portion of said secondary pathway distinct from said main pathway;
a secondary barrier movable between a closed and an open position, said closed position of said secondary barrier blocking said secondary pathway;
said secondary barrier movable independent of any movement by said main barrier;
a single pressure cylinder;
a single piston located within said pressure cylinder; and
a single actuation shaft coupled to said piston, said actuation shaft influencing the position of both said main barrier and said secondary barrier when said piston to which said actuation shaft is coupled moves within said cylinder.

18. The valve of claim 17 wherein said piston has a circular cross-section with a perimeter slidably abutting a cylindrical wall of said pressure cylinder.

19. The valve of claim 18 wherein a sliding seal is attached to said perimeter of said piston.

20. The valve of claim 17 wherein said piston is rigid.

21. The valve of claim 17 wherein said secondary barrier is movable without any movement by said main barrier.

22. The valve of claim 17 wherein said main barrier is movable independent of any movement by said secondary barrier relative to said secondary pathway.

23. A soft start valve for controlling gas flow within vacuum handling equipment, the valve comprising in combination:
an inlet for gases passing into said valve;
an outlet for gases passing out of said valve;
a main pathway extending between said inlet and said outlet;
a main barrier movable between a closed position and an open position, said closed position of said main barrier blocking said main pathway;
a soft start pathway extending between said inlet and said outlet, at least a portion of said soft start pathway distinct from said main pathway;
a soft start barrier movable between a closed position and an open position, said closed position of said soft start barrier blocking said soft start pathway;
at least one actuation shaft influencing the position of both said main barrier and said soft start barrier;
wherein said actuation shaft is capable of movement in two directions including a first direction corresponding to said soft start barrier moving from said closed position to said open position, said second direction corresponding with said main barrier moving from said closed position to said open position; and
wherein said actuation shaft includes a piston thereon, said piston residing within a cylinder with actuation ports located on either side of said piston within said cylinder, such that when actuation fluid is entered on one side of said piston to increase a pressure on one side of said piston, said piston is caused to move within said cylinder, in turn causing said actuation shaft to move.

* * * * *